United States Patent [19]

Slavik et al.

[11] Patent Number: 5,686,774
[45] Date of Patent: Nov. 11, 1997

[54] REDUCED VIBRATION MOTOR WINDING ARRANGEMENT

[75] Inventors: Charles J. Slavik, Rexford; Ralph G. Rhudy, Scotia; Ralph E. Bushman, Lathem, all of N.Y.

[73] Assignee: The United States of America as represented by the Department of Energy, Washington, D.C.

[21] Appl. No.: 367,615

[22] Filed: Jan. 3, 1995

[51] Int. Cl.$^6$ .............................. H02K 1/00; H02K 5/24
[52] U.S. Cl. .............................. 310/198; 310/51
[58] Field of Search .............................. 310/198, 51, 180, 310/184, 187, 206, 207; 318/771

[56] References Cited

U.S. PATENT DOCUMENTS

| | | | |
|---|---|---|---|
| 4,200,817 | 4/1980 | Bratoljic | 310/198 |
| 4,227,107 | 10/1980 | Ban et al. | 310/198 |
| 4,341,970 | 7/1982 | Auinger | 310/184 |
| 5,068,587 | 11/1991 | Nakamura | 318/771 |
| 5,122,705 | 6/1992 | Kusase et al. | 310/68 D |
| 5,142,213 | 8/1992 | Stelter | 318/771 |
| 5,274,322 | 12/1993 | Hayashi et al. | 322/90 |
| 5,300,870 | 4/1994 | Smith | 318/768 |
| 5,449,962 | 9/1995 | Shichijyo et al. | 310/184 |

OTHER PUBLICATIONS

Hughes, A., "New 3-Phase Winding of Low m.m.f. Harmonic Content", Proceedings of The Institution of Electrical Engineers, vol. 117, No. 8, pp. 1657–1666, Aug. 1970.

*Primary Examiner*—Steven L. Stephan
*Assistant Examiner*—Michael Wallace, Jr.
*Attorney, Agent, or Firm*—Virginia B. Caress; William R. Moser; Paul A. Gottlieb

[57] ABSTRACT

An individual phase winding arrangement having a sixty electrical degree phase belt width for use with a three phase motor armature includes a delta connected phase winding portion and a wye connected phase winding portion. Both the delta and wye connected phase winding portions have a thirty electrical degree phase belt width. The delta and wye connected phase winding portions are each formed from a preselected number of individual coils each formed, in turn, from an unequal number of electrical conductor turns in the approximate ratio of $\sqrt{3}$. The individual coils of the delta and wye connected phase winding portions may either be connected in series or parallel. This arrangement provides an armature winding for a three phase motor which retains the benefits of the widely known and utilized thirty degree phase belt concept, including improved mmf waveform and fundamental distribution factor, with consequent reduced vibrations and improved efficiency.

4 Claims, 3 Drawing Sheets

FIG 1

REDUCED VIBRATION MOTOR WINDING ARRANGEMENT

RIGHTS OF THE GOVERNMENT

The United States Government has rights in this invention pursuant to Contract No. DE-AC12-76SN00052 awarded by the United States Department of Energy.

BACKGROUND OF THE INVENTION

1. Field of the Invention

The present invention relates generally to an electric motor winding and, more particularly, to a three phase motor armature winding arrangement designed to reduce motor vibration and improve efficiency.

2. Description of the Prior Art

It is well known that electric motors generate vibration during operation. A major source of vibration is the magnetomotive force (mmf) developed by the stator windings.

The common practice for stator windings for commercial three phase electric motors is to use phase belts of sixty electrical degrees. (The width of a phase belt is the spread, in electrical degrees of the slots per pole per phase.) It is also known that increasing the number of phase belts per pole, and correspondingly decreasing the width of the individual phase belts results in a lower harmonic content in the mmf waveform and thus reduced vibration. Such a winding is also more effective magnetically, producing more fundamental mmf per unit of winding current. Both reduced harmonic content and improved magnetic efficiency contribute to greater motor efficiency in otherwise similar motors having more phase belts per pole.

For some very special applications, including some adjustable speed AC motors, windings, comprising thirty degree phase belts and supplied by a six phase power supply have been used. Two separate three phase power supplies with voltages equal in magnitude and displaced thirty degrees in phase are usually used in these applications. Such a power supply system is more costly and more complex than systems for commonly used three phase motors.

In an article entitled "New 3-Phase Winding Of Low m.m.f. Harmonic Content", Proceedings of the Institution of Electrical Engineers, Vol. 117, No. 8, August 1970, pages 1657 through 1666, A. Hughes discloses a winding arrangement having phase belt widths of less than sixty electrical degrees and which may be supplied from a conventional three phase power system. The essence of the Hughes winding is the subdivision of a conventional three phase sixty electrical degree phase belt winding into a delta connected winding portion and a wye connected winding portion. The two winding portions are connected in parallel across the power supply. This method of connecting the two winding portions uses the inherent thirty electrical degree phase displacement between line-to-line and line-to-neutral voltages and provides the phase relationships required for a thirty degree phase belt winding. In the Hughes winding, the amplitudes of the voltages induced in the delta and wye connected windings by a space fundamental flux density distribution must closely approximate the ratio (delta connected winding voltage)/(wye connected winding voltage)= √3 (square root of three).

In the Hughes winding, identical coils are used for the delta and wye connected windings. In the ideal application, the desired ratio of induced voltages is achieved by subdividing each sixty electrical degree phase belt into one delta and one wye connected winding phase belt, having widths of approximately 38.2 and 21.8 electrical degrees, respectively. In practice, except in the rare case of a motor having eleven or nineteen slots per sixty electrical degree phase belt width, it is not possible to closely approximate delta and wye phase belts of 38.2 and 21.8 electrical degree width, respectively. As a result, it is often necessary to intersperse the phase belts to approach the desired induced voltage ratio. In addition, it is not practical for use in motor designs having a low number of slots per sixty electrical degree phase belt width (such as 8 or less slots) and is feasible only for motor designs having nine or more slots per sixty electrical degree phase belt.

Consequently, a need exists for a motor winding arrangement which not only exhibits the improved operating characteristics of the Hughes winding arrangement but also is well suited for use in motor designs having any even number of slots per sixty electrical degree phase belt width without requiring phase interspersion to approach the desired induced voltage ratio.

SUMMARY OF THE INVENTION

The present invention relates to a motor winding arrangement designed to satisfy the aforementioned needs. The motor winding arrangement of the present invention retains the benefits afforded by thirty electrical degree phase belts, including improved magnetomotive force waveform and fundamental distribution factor, with resulting reduced vibration and improved efficiency. In addition, the motor winding arrangement of the present invention is an improvement over the thirty electrical degree phase belt concept previously used since its configuration results in no additional power supply leads being required beyond those required for a conventional three phase motor.

Accordingly, the present invention is directed to a motor winding arrangement comprising a delta connected phase winding portion having a thirty electrical degree phase belt width and a wye connected phase winding portion having a thirty electrical degree phase belt width. The individual phase groups of the two winding portions are interleaved so that every pair of physically adjacent phase groups consists of one phase group in the delta portion and one in the wye portion. The delta connected winding and the wye connected winding are connected either in parallel or in series across the power supply.

In addition, the present invention is directed to a method for forming an individual phase winding arrangement having a sixty electrical degree phase belt width for use with a three phase motor armature which includes the steps of configuring a portion of the individual phase winding in delta connected fashion so that the delta connected portion has a thirty electrical degree phase belt width and configuring the remainder of the individual phase winding in wye connected fashion so that the wye connected portion also has a thirty electrical degree phase belt width. The delta connected winding and the wye connected winding are connected either in parallel or in series across the power supply.

These and other features and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
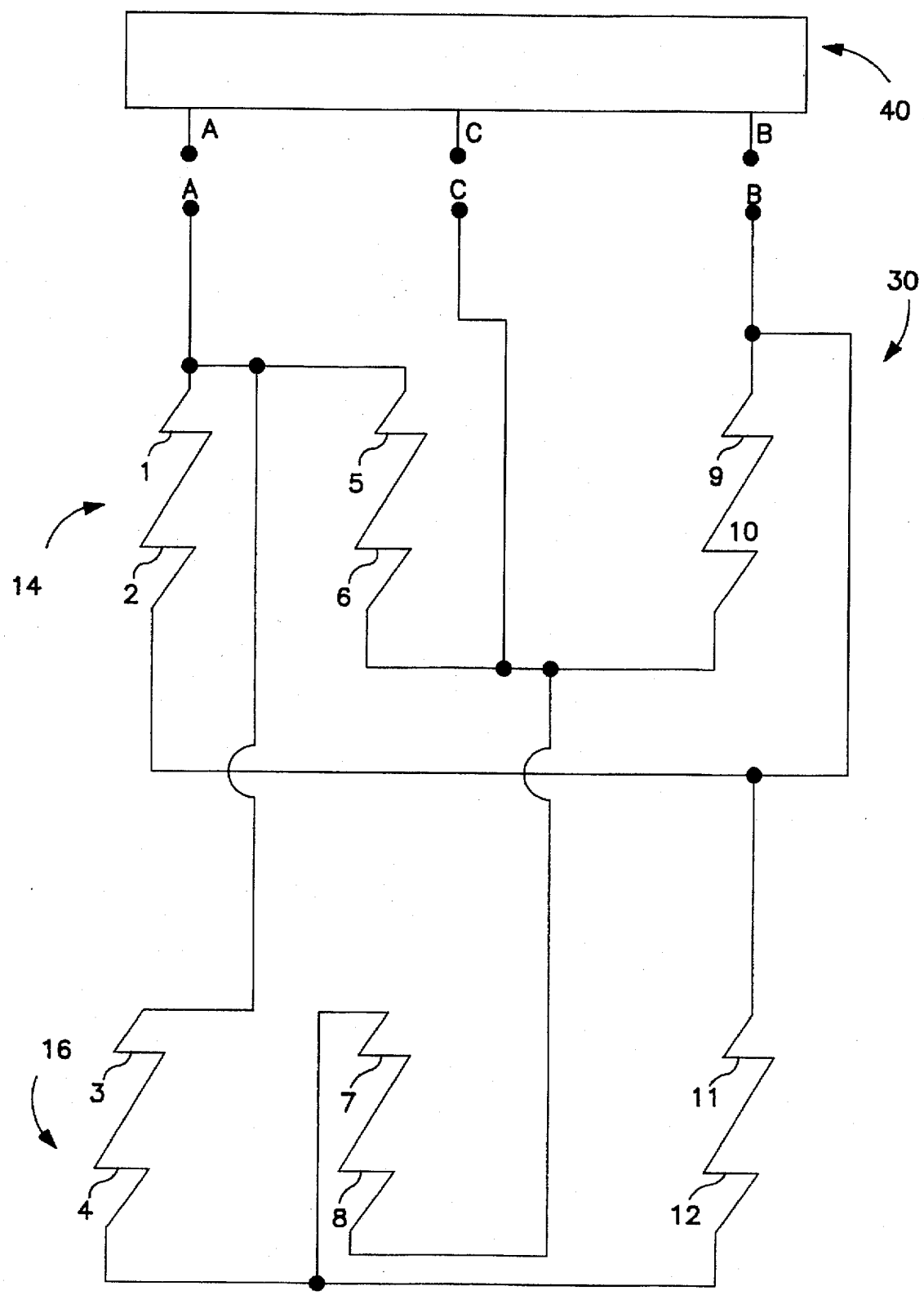
FIG. 1 is a schematic winding diagram showing one pole of a 48 slot, 4 pole winding, having the delta and wye phase windings connected in parallel.

The present invention relates to an improved winding arrangement for use in a three phase electric motor which provides an improved magnetomotive force waveform and fundamental distribution factor, with consequent reduced vibration and improved efficiency. The essence of the winding arrangement of the present invention is the subdivision of a conventional three phase, sixty electrical degree phase belt winding into a delta connected phase winding portion and a wye connected phase winding portion. The two phase winding portions are adapted to be connected across the same power supply.

In the winding arrangement of the present invention, the delta and wye connected phase winding portions comprise phase belts each having a thirty (30) electrical degree phase belt width (spanning equal numbers of motor armature slots). However, the individual coils forming the delta connected phase winding portion have a different number of electrical conductor turns than the coils forming the wye connected phase winding portion. Since the delta connected phase winding portion has an imposed voltage that is √3 times the imposed voltage of the wye connected winding portion, the turns in series per phase of the delta connected phase portion must be very nearly √3 times the turns in series per phase of the wye connected phase portion. If both delta and wye connected phase winding portions are connected with the same number of parallel circuits, the following are examples of appropriate and practical electrical conductor turns per coil combinations. Examples of the number of turns per coil combination of the delta and wye connected phase winding portions are seven (7) and four (4), twelve (12) and seven (7), and nineteen (19) and eleven (11) electrical conductor turns per coil, respectively. In these cases, the induced voltage ratio differs from the ideal by only about one (1) percent.

If the delta and wye connected phase winding portions are connected so that the number of parallel circuits are different, the delta and wye connected coils may have the turns per coil combinations corresponding to various circuit combinations as shown in Table 1, below:

TABLE 1

| Circuit Ratio (delta/wye) | 4/1 | 2/1 | 1/1 | 1/2 | 1/4 |
|---|---|---|---|---|---|
| Turns/Coil Ratio (delta/wye) | 7/1 | 7/2 | 7/4 12/7 | 7/8 6/7 | 3/7 |

The feasible turns/coil combinations for delta and wye connected coils for various circuit arrangements shown in Table 1, above, apply to a 4 pole, 48 slot winding. The circuit ratio is defined as the number of parallel circuits in the delta connected winding portion versus the number of parallel circuits in the wye connected winding portion.

The magnetomotive force (m.m.f.) waveform harmonics for the winding arrangement of the present invention for use as a 4 pole, 48 slot three phase winding are shown below in Table 2 and are compared to the corresponding waveform harmonics for a prior art three phase winding.

TABLE 2

| Order of Harmonic | Standard Winding (mmf %) | New Winding (mmf %) | mmf ratio |
|---|---|---|---|
| 1 | 100.000 | 103.533 | 1.035 |
| 5 | 4.288 | 0.085 | 0.020 |
| 7 | 2.350 | 0.047 | 0.020 |
| 11 | 1.197 | 1.239 | 1.035 |
| 13 | 1.013 | 1.048 | 1.035 |
| 17 | 0.968 | 0.019 | 0.020 |
| 19 | 1.128 | 0.022 | 0.020 |
| 23 | 4.438 | 4.501 | 1.035 |
| 25 | 4.000 | 4.141 | 1.035 |
| Fundamental Winding Factor | 0.95766 | 0.99145 | 1.0353 |

As seen in Table 2, the fundamental winding factor of the winding arrangement of the present invention more closely approaches unity than the prior art winding. Therefore the fundamental frequency or first order harmonic mmf waveform of the winding arrangement of the present invention has a 3.5% increase over the standard winding. In addition the 5, 7, 17, 19, etc. order mmf harmonics are reduced by a factor of 50 while the 11, 13, 23, 25, etc. order mmf harmonics are only increased by 3.5%. Therefore the overall harmonic content of the winding mmf is greatly reduced by the present invention winding over the standard winding.

A schematic diagram for one pole of the armature winding arrangement of the present invention for use in a 48 slot, 4 pole winding is illustrated in FIG. 1 and is designated generally by the numeral 30. The delta connected phase winding portion is identified by the numeral 14 and the wye connected phase winding portion is identified by the numeral 16. The three electrical phases are labeled A, B, and C. As seen in FIG. 1, the delta connected coils are in slots numbered 1, 2, 5, 6, 9, and 10 and the wye connected coils are in slots numbered 3, 4, 7, 8, 11, and 12. This numbering scheme shows how the coils in twelve consecutive slots of each pole would be connected. FIG. 1 also shows that the delta and wye windings are connected in parallel across the A, B, and C terminals of the same standard three phase power supply 40.

Figure 2:
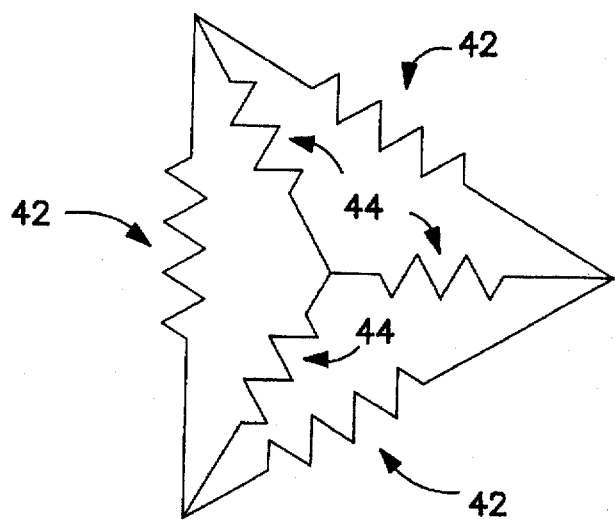
FIG. 2 is a schematic connection diagram showing the parallel connection embodiment for the delta and wye phase windings.
Figure 3:
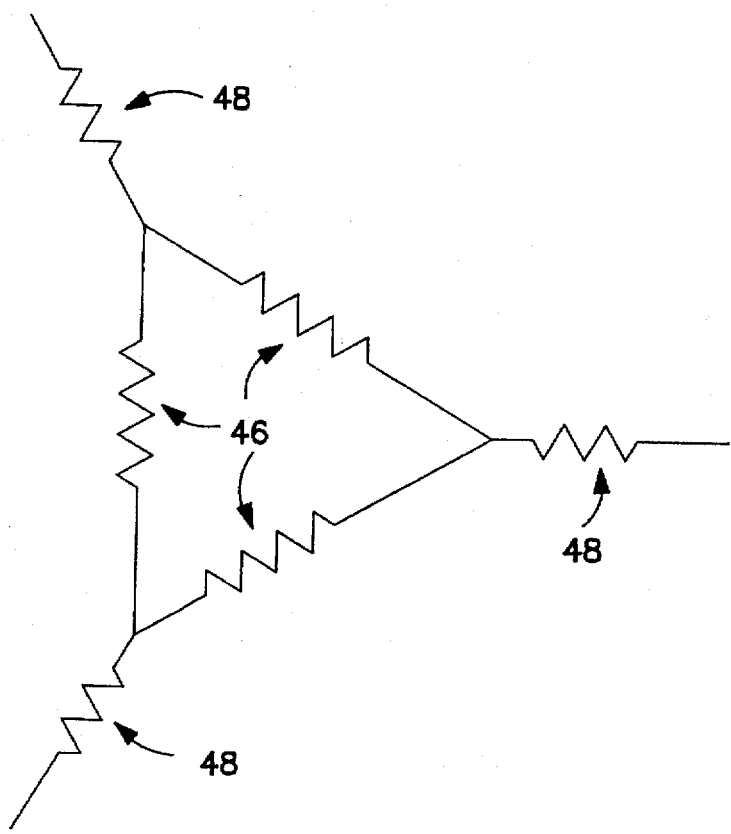
FIG. 3 is a schematic connection diagram showing the series connection embodiment for the delta and wye phase windings.

The invention described above consists of the delta and wye winding portions connected in parallel with different numbers of turns per coil used to balance voltages at the connections of the delta and wye winding portions. FIG. 2 shows the parallel connection of the delta and wye winding portions and is called the parallel delta-wye winding. The delta windings are designated by numeral 42 and the wye windings by numeral 44. Due to the parallel connection of the delta and wye winding portions, circulating currents between the windings may be developed. A modification to the invention that will reduce these circulating currents but maintain the advantages herein described is shown in FIG. 3. The delta winding portion is connected in series with the wye winding portion and this modification is called the series delta-wye winding. In FIG. 3 the delta winding portions are designated by 46 and the wye winding portions are designated by 48.

Figure 4:
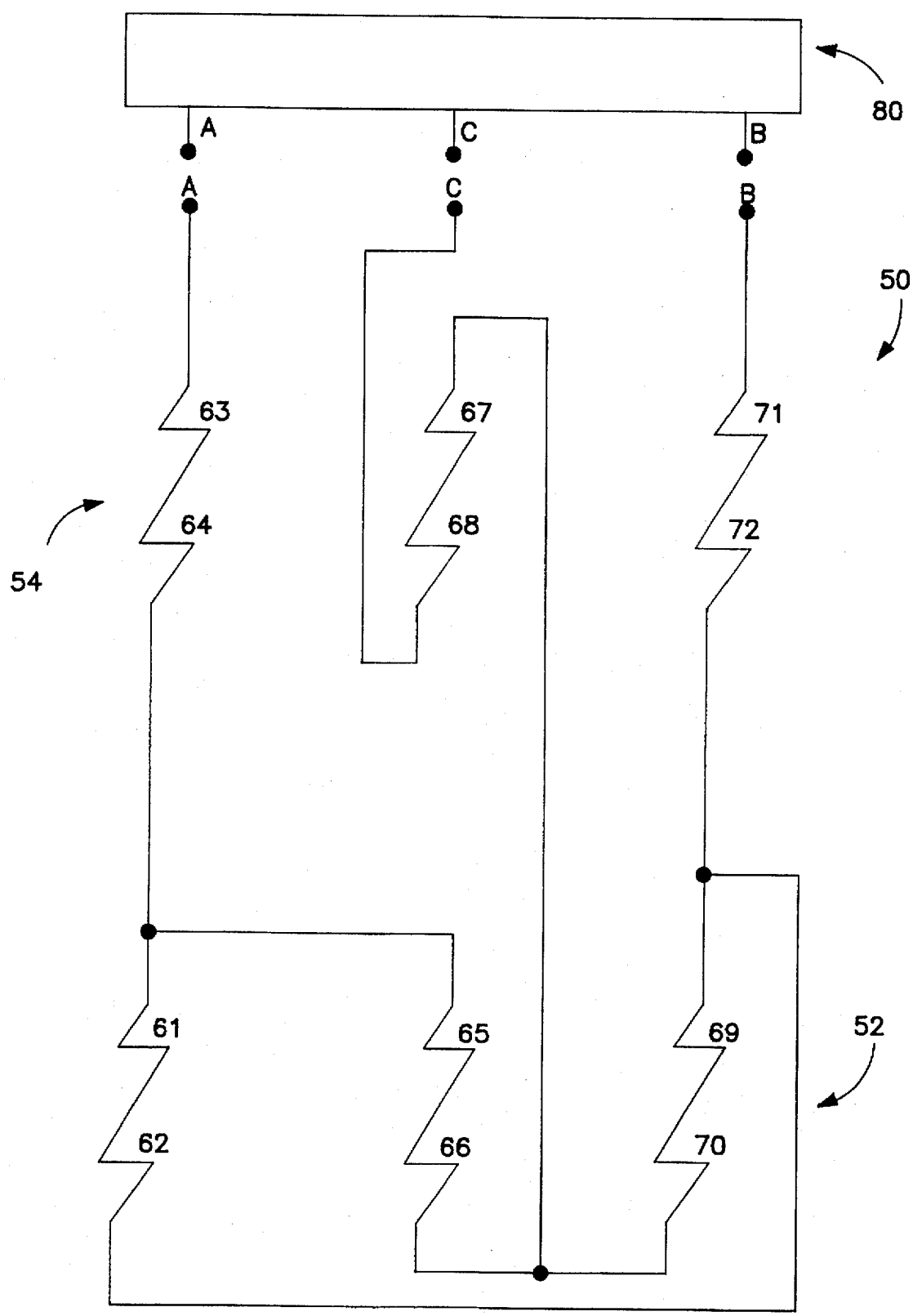
FIG. 4 is a schematic winding diagram showing one pole of a 48 slot, 4 pole winding, having the delta and wye phase windings connected in series.

A schematic diagram for one pole of the armature winding arrangement of the series delta-wye modification of the present invention for use in a 48 slot, 4 pole winding is illustrated in FIG. 4 and is designated generally by the numeral 50. The delta connected phase winding portion is identified by the numeral 52 and the wye connected phase winding portion is identified by the numeral 54. The three electrical phases are labeled A, B, and C. As seen in FIG. 4, the delta connected coils are in slots numbered 61, 62, 65, 66, 69, and 70 and the wye connected coils are in slots numbered 63, 64, 67, 68, 71, and 72. This numbering scheme of the coils shows how the twelve consecutive slots of each pole would be connected. FIG. 4 also shows that the delta and wye windings are connected in series across the A, B, and C terminals of the same standard three phase power supply 80.

For the series delta-wye winding to have the same induced voltage as the parallel delta-wye winding, the series delta-wye winding must be connected with twice the number of parallel delta winding portion circuits and twice the number of parallel wye winding portion circuits as the parallel delta-wye winding. In the series delta-wye winding the voltages from the delta winding portion and the wye winding portion add, hence the reconnection from n circuits per phase group to 2n circuits per phase group to accommodate the same terminal voltages and currents.

The winding arrangements 30 and 50 are well suited to motor designs having any even number of slots per sixty electrical degree phase belt width, including the low number slots such as 2, 4, 6 and 8.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

We claim:

1. In a three phase electric motor, an individual phase winding arrangement having a sixty electrical degree phase belt width, comprising:

a) a delta connected phase winding portion having a thirty electrical degree phase belt width, wherein said delta connected phase winding portion includes a preselected number of individual coils, each said coil comprising electrical conductor turns, said coils positioned in separate slots of said motor; and b) a wye connected phase winding portion having a thirty electrical degree phase belt width, wherein said wye connected phase winding portion includes the same preselected number of individual coils as said delta portion, each said coil comprising electrical conductor turns, said coils positioned in different separate slots of said motor from said delta portion, and wherein c) said delta connected phase winding portion and said wye connected phase winding portion are connected in parallel or in series across the same standard three phase power supply; and wherein the number of electrical turns forming each of said coils of said delta connected phase winding portion is very nearly √3 times the number of electrical conductor turns per coil forming said wye connected phase winding portion.

2. The phase winding arrangement as claimed in claim 1 wherein said delta connected phase winding portion and said wye connected phase winding portion are connected in series.

3. The phase winding arrangement as claimed in claim 1 wherein the number of said slots containing said delta portion coils is equal to the number of said slots containing said wye portion coils.

4. The phase winding arrangement as claimed in claim 1 wherein there are 8 slots or fewer per said sixty electrical degree phase belt width.

* * * * *